UNITED STATES PATENT OFFICE.

LOUIS BRANDT AND AUGUST W. BRANDT, OF STOCKTON, CALIFORNIA.

FIRE-KINDLER.

SPECIFICATION forming part of Letters Patent No. 622,200, dated April 4, 1899.

Application filed April 11, 1898. Serial No. 677,228. (No specimens.)

*To all whom it may concern:*

Be it known that we, LOUIS BRANDT and AUGUST W. BRANDT, citizens of the United States, residing at Stockton, in the county of San Joaquin, State of California, have invented certain new and useful Improvements in Fire-Kindlers; and we do declare the following to be a full, clear, and exact description of the invention, such as will enable others skilled in the art to which it appertains to make and use the same.

The said fire-kindler consists of the following ingredients combined in the proportions and in the manner hereinafter stated, viz: First we melt forty pounds of rosin in a suitable kettle, applying the heat preferably by steam instead of direct application of fire beneath the kettle, so as to avoid as much as possible all chance of accidental combustion. When the rosin is sufficiently melted, we add two and three-fourths gallons of crude petroleum, and as soon as the mixture has cooled sufficiently we add one quart of wood-alcohol and mix the three ingredients thoroughly. We then add tanbark and sawdust prepared from redwood, half and half, in sufficient quantity until the mass is of the consistency of ordinary dough, when it is molded into "sticks," preferably four inches long by one inch square. Metal molds are preferably used. By the use of redwood-sawdust a pleasant odor is imparted to the atmosphere of the room in which the kindler may be used. The tanbark gives great consistency and degree of hardness and the wood-alcohol renders the kindler highly inflammable. One stick will be sufficient to ignite ten pounds of hard coal in an ordinary fire-grate.

What we claim, and desire to secure by Letters Patent of the United States, is—

The herein-described fire-kindler, prepared in sticks for use, composed of rosin, crude petroleum, tanbark, redwood-sawdust and wood-alcohol in the proportions specified.

In testimony whereof we affix our signatures in presence of two witnesses.

LOUIS BRANDT.
AUGUST W. BRANDT.

Witnesses:
MOLBRY HAYNES,
JOSHUA B. WEBSTER.